United States Patent

[11] 3,544,743

| [72] | Inventors | Kazuhiro Takei<br>No. 3 Awa-machi, Hagashi-ku, Nagoya;<br>Isamu Asano, No. 1-6, Takanawate,<br>Yahagi-cho, Okazaki, Japan |
|---|---|---|
| [21] | Appl. No. | 795,174 |
| [22] | Filed | Jan. 30, 1969 |
| [45] | Patented | Dec. 1, 1970 |
| [32] | Priority | Feb. 10, 1968 |
| [33] | | Japan |
| [31] | | 43/8450 |

[54] PRINTED CIRCUIT CONTROL PANEL FOR A VEHICULAR STEERING MECHANISM
7 Claims, 8 Drawing Figs.

| [52] | U.S. Cl. | 200/61.54 |
|---|---|---|
| [51] | Int. Cl. | H01h 9/00 |
| [50] | Field of Search | 200/61.27, 61.54, 11(D), 61.57; 340/(Inquired) |

[56] References Cited
UNITED STATES PATENTS

| 1,718,628 | 6/1929 | Bowker | 200/61.54X |
| 2,863,015 | 12/1958 | Ahrens | 200/61.54 |

*Primary Examiner*—Robert K. Schaefer
*Assistant Examiner*—M. Ginsburg
*Attorneys*—Robert E. Burns and Emmanuel J. Lobato ABSTRACT: A plurality of printed circuits mounted on a circuit board which in turn is mounted on a section of a vehicular steering wheel, each individual circuit being electrically connected to contacting elements that eventually lead to such electrically actuatable devices as a horn, a blinking turn signal indicator, an overdrive mechanism, and a light dimmer unit. Manually operable electrical pushbutton switches are also mounted on the same portion of the steering wheel and arranged so that each switch when operated completes a corresponding one of the electrical circuits which in turn actuates a corresponding one of the electrically actuable devices.

PATENTED DEC 1 1970
3,544,743
SHEET 1 OF 2
Fig.1
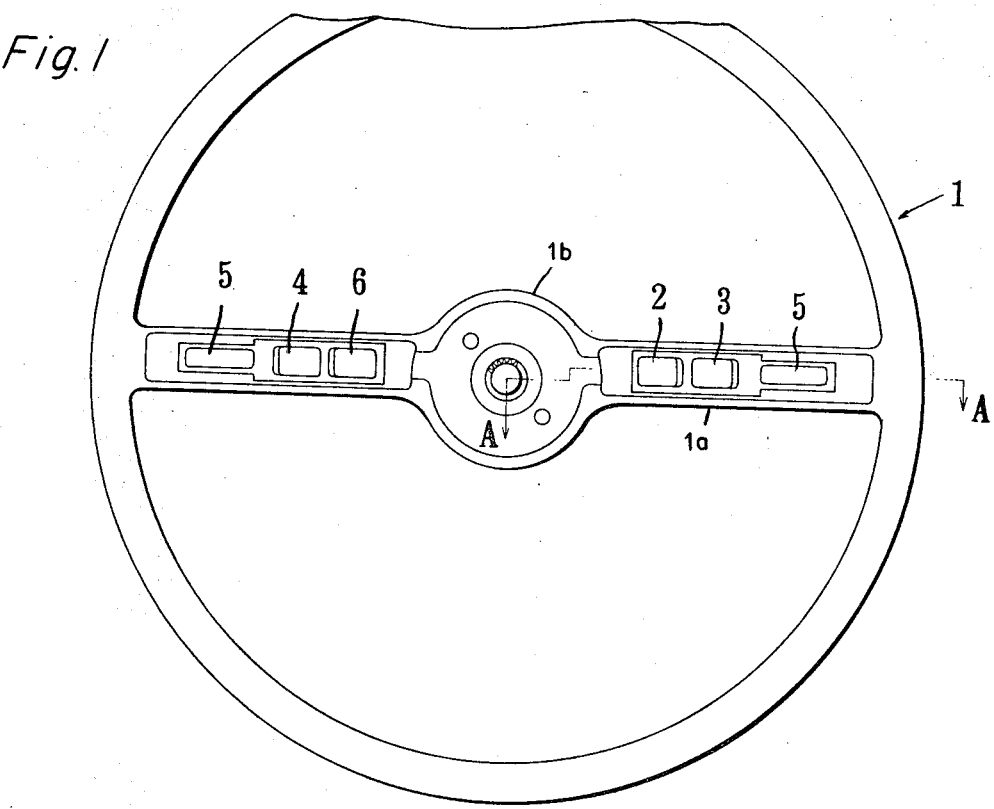
Fig 3a
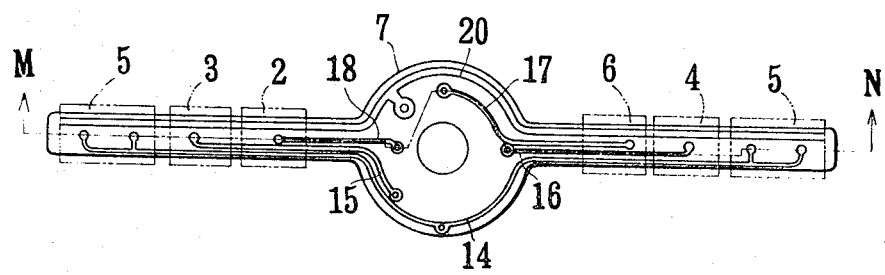
Fig.3b

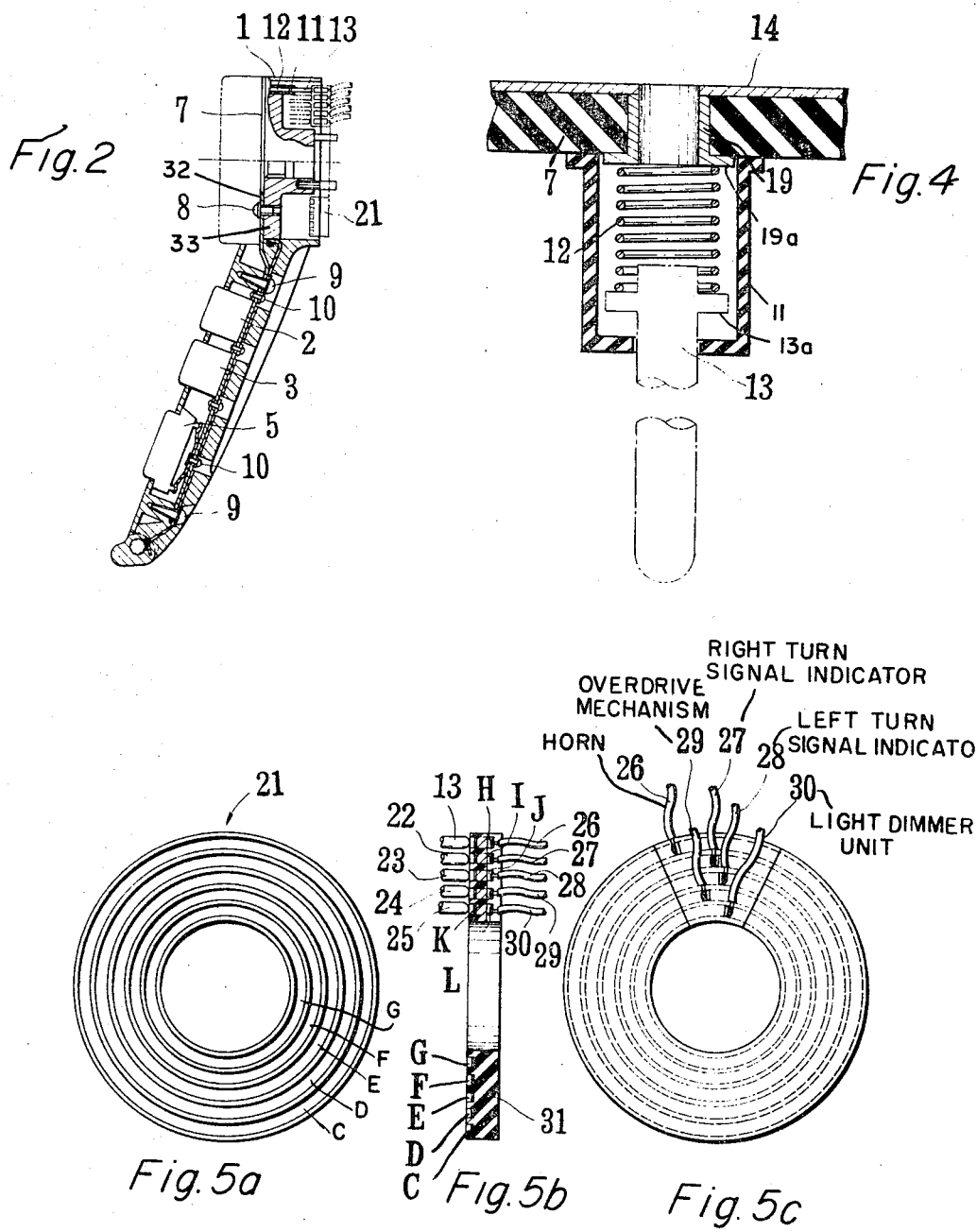

PRINTED CIRCUIT CONTROL PANEL FOR A VEHICULAR STEERING MECHANISM

The present invention relates to electrical circuits suitably installed and mounted on the steering wheel of a motor vehicle, the electrical circuits being printed on a printed circuit board which in turn is mounted upon an elongated axial bar extending diametrically across and integrally connected at its end sections to the inside surface of a typical circular steering wheel and at its midsection to the typical steering column. In the prior art, it is conventional for a horn to be mounted upon the steering wheel usually at the top end of the steering column, and in addition, it is known to mount switches on the steering wheel for actuating turn signal units. In the present invention, a plurality of switches are installed on the steering wheel for actuating such devices as horns and turn signal indicators, light dimming units, and, overdrive units, thereby to make such switches more accessible to and convenient for actuation by the operator, which in turn provides for safer driving.

However, were such units to be installed on a steering wheel during the molding process thereof or by mounting it on a plate which must later be installed on the steering wheel as has been done in the prior art using the standard electrical connections and electrical wiring, the resultant units would be of such size and so bulky as to add substantially to the difficulty of manufacture and installation. This results in such a higher cost to the manufacturer that it is unlikely that such units would be installed on automobile steering wheels.

An object of the present invention is to provide for an automobile an improved arrangement for operating the controls for such devices as horns, turn signal units et cetera Another object of the present invention is to provide a more compact, efficient and convenient control panel for a vehicle.

It is still another object of the present invention to provide a control panel for a vehicle to help the vehicle operator safely to operate the vehicle.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings.

FIG. 1 is a plan view of a steering wheel of the present invention;

FIG. 2 is a sectional view taken along line A—A of FIG. 1;

FIG. 3 consists of two FIGS. 3a, and FIG. 3b, of which FIG. 3a is a plan view of the circuit support arm shown in FIG. 1 with its cover plate removed; and FIG. 3b is a sectional view taking along lines M—N of FIG. 3a;

FIG. 4 is an enlarged sectional view of a section of the support arm shown in FIG. 3b and indicated by B; and FIG. 5 consists of three figures, FIG. 5a, FIG. 5b, and FIG. 5c of which FIG. 5a is an enlarged plan view of the contact rings shown in FIG. 2; FIG. 5b is an enlarged sectional view of the contact rings shown in FIG. 2; and FIG. 5c is a view of the reverse side of the contact rings shown in FIG. 5a.

Referring now in more detail to the drawings, wherein similar reference numerals identify corresponding parts throughout the several views, 1 represents the steering wheel of the vehicle, but which could also include a steering wheel of a ship or a plane or other transporting mechanism, substantially as shown.

The steering wheel 1 includes an elongated axial crossarm 1a extending diametrically across and integrally connected to the inside surface of the ring-shaped portion of the steering wheel 1, the crossarm 1a being connected at its midpoint to a conventional steering column. Installed on the right side (FIG. 1) of the crossarm 1a are three manually operable pushbutton switches of which 2 is a switch for a light dimmer unit, 3 is the switch for the blinking right turn signal indicator, and 5 is a switch for the horn mechanism. Mounted on the left half (FIG. 1) of the crossarm 1a are 3 additional switches, of which 6 is a switch for an overdrive mechanism, 4 is a switch for a blinking left turn signal indicator, and 5 is another switch for the horn mechanism. All of the six switches mentioned are secured to an elongated printed circuit board 7 constructed of suitable nonelectrically conductive material such as bakelite, the shape of the board being made to correspond closely to the shape of the crossarm 1a including an apertured disk-shaped portion which corresponds to the cross-sectional shape of the steering column. The switches are secured to the printed circuit board 7 by rivets 10 and the printed circuit board 7 is secured to the crossarm 1a by the bolts 8 and 9. The crossarm 1a of the steering wheel 1 includes a substantially disk-shaped (in plan view) housing 1b positioned at the top of the steering column, which housing is hollow and has mounted therein five electrically nonconductive bushings 11. Each bushing houses an electrically conductive coil spring 12, as shown in FIG. 4, and between the bottom of the bushing 11 and the lower end of the spring 12 is positioned a boss 13a of the electrically conductive contact pin 13. The coil spring 12 continuously biases the pin 13 downwardly, as described in more detail below.

On the upper surface of the printed circuit board 7, there are mounted five printed electrical circuits including the leads 14, 15, 16, 17 and 18, which are the positive portion of the circuits for the horn mechanism, the right turn signal indicator, the left turn signal indicator, the overdrive mechanism, and the light dimmer unit, respectively. Each of the positive leads is electrically connected to a corresponding metallic and electrically conductive collar 19. The collar 19 is, as shown in FIG. 4, inserted in a hole extending through the printed circuit board 7 so that a boss 19a on its bottom section may be positioned within the electrically nonconductive bushing 11, thus the boss 19a of the collar 19 is in continuous contact with the upper end of the electrically conductive spring 12. Through such an arrangement, each circuit mounted on the upper surface of the printed circuit board 7 is brought into contact and an electrical connection is established with each contact pin through its corresponding collar 19 and spring 12. The spring 12 is supported between the boss 19a of the collar 19 and the boss 13a on the upper part of the contact pin 13. In addition, the contact point 32 of the ground lead 20 is fixed on a metallic part 33 of the boss of the steering wheel by means of a metallic bolt 8. Accordingly, the ground lead 20 is electrically connected from the steering column to the main body of the car through the bolt 8 and the metallic part 33 of the boss. The contact points of the switches 2, 3, 4, 5 and 6 are kept in contact with the common ground lead 20 by means of their corresponding leads, and by pushing any one of the pushbuttons of the switches, the ground lead 20 is brought in contact with the positive terminal of the corresponding switch whereby the circuit closes. Alternatively, the contact points of the switches 2, 3, 4, 5 and 6 may be electrically connected to the corresponding positive terminals, and by pushing any one of the pushbuttons, the corresponding contact point is brought in contact with the ground lead. Further, the contact points of the switches 2, 3, 4, 5 and 6 may be so constructed that they are made of electrically conductive plates having suitable area, and, by pushing any one of the pushbuttons with short circuit plates fixed at the bottom sections, the positive and negative terminals are brought in contact with each other.

It is noted that the remaining contact pins 22, 23, 24 and 25 (FIG. 5) are received and connected in a manner similar to pin 13 by other of the collars 19.

Referring now more particularly to FIG. 5, there is shown a set of five concentrically arranged electrically conductive rings indicated generally by the numeral 21, each of which is insulated one from the other and mounted on a centrally apertured disk-shaped plate 31 which is constructed of suitable electrically nonconductive material. The plate 31 is fixed to the portion of the conventional steering column that does not turn when the steering wheel is turned, therefore the plate 31 does not turn when the wheel 1 is turned. The concentric rings indicated generally by the numeral 21 include the rings C, D, E, F and G, which are electrically connected by the electrical leads 26, 27, 28, 29, and 30, respectively, to the above-mentioned devices, i.e., the horn mechanism, the right turn signal indicator, the left turn signal indicator, the overdrive mechanism, and the light dimmer unit, respectively. The concentric rings C, D, E, F and G are electrically connected to the leads 26, 27, 28, 29 and 30, respectively, through the intermediacy of the electrically conductive connecting pieces H, I, J, K and L, respectively. It is noted that each of the pins 13, 22, 23, 24 and 25 are biased into physical contact with their corresponding rings by the springs 12. Thus, the wheel 1 can be turned in any direction as far as possible and electrical contact will be maintained between the circuits and their corresponding rings because as the wheel is turned and the contact pins follow the general circular motion of the wheel 1, the contact pins, which slidingly engage the nonrotatable rings 21, ride along their corresponding rings thereby to maintain the electrical connection between the printed electrical circuits and their corresponding devices as noted above.

In operation, therefore, when for example one of the button switches 5 for the horn is depressed by the operator, the horn mechanism circuit is completed between the ground lead 20 and the positive lead 14 which is electrically connected through the collar 19, spring and pin 12 and 13, ring C connecting with piece H, and lead 26 back through the horn mechanism to ground, thereby actuating the horn. Each of the other devices mentioned above are actuated in the same manner by pushing the corresponding button switch.

By the use of the present invention, a control panel is provided which is more reliable and more economical to manufacture. The smaller parts and the arrangements thereof make it possible to mount the unit on a portion of the steering wheel which in turn is not only more convenient for the operator but in addition, since it is so accessible, it provides for safer driving because the operator need not lean forward and fumble around for the corresponding switches which are normally mounted on the conventional dashboard, while driving the vehicle. It is noted that the present invention encompasses other circuit arrangements such as integrated circuits which are smaller in size than the printed circuits described above.

Numerous alterations of the structure herein disclosed will suggest themselves to those skilled in the art. However, it is to be understood that the present disclosure relates to a preferred embodiment of our invention which is for purposes of illustration only and not to be construed as a limitation of the invention. All such modifications which do not depart from the spirit of the invention are intended to be included within the scope of the appended claims.

We claim:

1. In a vehicular steering mechanism: a rotatably mounted steering member; electric circuit means mounted on said steering member for rotational movement therewith including a printed circuit having means defining a plurality of normally open current paths; electrical connecting means fixedly mounted with respect to rotational movement of said steering member for electrically connecting individual ones of said current paths to electrically energizable devices; and a plurality of manually operable switch means mounted on said steering member for selectively closing individual ones of said plurality of normally open current paths.

2. In the steering mechanism according to claim 1, wherein said electric circuit means includes a plurality of electrically conductive contact pins; and electrically conductive spring means electrically connected to each of said current paths for continuously biasing said contact pins into electrical contact with said electrical connecting means.

3. In the steering mechanism according to claim 2, wherein said electrical connecting means comprises a plurality of electrically conductive rings; and means mounting each of said rings in contact with respective ones of said contact pins.

4. In the steering mechanism according to claim 2, wherein said printed circuit comprises a circuit board on which said plurality of current paths are mounted; means defining a plurality of apertures in said circuit board equal in number to the number of said current paths; and a plurality of electrically conductive collars each positioned within one of said apertures, each of said collars having one end in electrical contact with one of said current paths and the other end in electrical contact with said spring means.

5. In the steering mechanism according to claim 4, wherein said electrical connecting means includes a plurality of electrically conductive rings; and means mounting each of said rings in contact with respective ones of said contact pins.

6. In the steering mechanism according to claim 1, wherein said plurality of current paths comprise means defining a common ground lead connected to each of said switch means common to each of said current paths; and means defining a plurality of positive leads each connected to one of said switch means and to said electrical connecting means.

7. In the steering mechanism according to claim 6, wherein each of said switch means comprises a push button switch having two electrically connectable contact points, and means connecting one of said contact points to said ground lead and the other of said contact points to one of said positive leads.